United States Patent [19]

Blonder et al.

[11] Patent Number: 4,897,711
[45] Date of Patent: Jan. 30, 1990

[54] SUBASSEMBLY FOR OPTOELECTRONIC DEVICES

[75] Inventors: Greg E. Blonder, Summit; Bertrand H. Johnson, Murray Hill, both of N.J.

[73] Assignees: American Telephone and Telegraph Company; AT&T Bell Laboratories, Murray Hill, N.J.

[21] Appl. No.: 163,664

[22] Filed: Mar. 3, 1988

[51] Int. Cl.$^4$ .................. H01L 23/02; G02B 6/30
[52] U.S. Cl. .................................. 357/74; 350/96.17; 350/96.18
[58] Field of Search ................ 357/74, 19; 350/96.11, 350/96.17, 96.18, 96.20; 372/36

[56] References Cited

U.S. PATENT DOCUMENTS

| | | | |
|---|---|---|---|
| 4,030,811 | 6/1977 | Khoe et al. ........................ | 350/96 |
| 4,119,363 | 10/1978 | Camlibel et al. ................. | 350/96.20 |
| 4,130,343 | 12/1978 | Miller et al. ..................... | 350/96.15 |
| 4,143,385 | 3/1979 | Miyoshi et al. .................. | 357/19 |
| 4,186,994 | 2/1980 | Denkin et al. ................... | 350/96.17 |
| 4,210,923 | 7/1980 | North et al. ...................... | 357/30 |
| 4,233,619 | 11/1980 | Webb et al. ...................... | 357/74 |
| 4,301,462 | 11/1981 | Lowry .............................. | 350/96.17 |
| 4,357,072 | 11/1982 | Goodfellow et al. ............. | 350/96.20 |
| 4,411,057 | 10/1983 | Duda et al. ...................... | 29/569 L |
| 4,553,811 | 11/1985 | Becker et al. .................... | 350/96.20 |
| 4,608,586 | 8/1986 | Kim .................................. | 357/30 |
| 4,611,884 | 9/1986 | Roberts ............................ | 350/96.15 |
| 4,611,886 | 9/1986 | Cline et al. ...................... | 350/96.20 |
| 4,695,120 | 9/1987 | Holder .............................. | 350/96.11 |
| 4,695,858 | 9/1987 | Takezawa et al. ................ | 357/19 |
| 4,732,446 | 3/1988 | Gipson et al. .................... | 350/96.18 |
| 4,779,946 | 10/1988 | Pimpinella et al. .............. | 350/96.20 |
| 4,807,238 | 2/1989 | Yokomori ......................... | 372/36 |

FOREIGN PATENT DOCUMENTS 0185306  10/1984  Japan .............................. 350/96.11

OTHER PUBLICATIONS

Petersen, K. E., "Silicon as a Mechanical Material", *Proc. of the IEEE*, vol. 70, No. 5, May 1982, pp. 420-457.
Holder, J. D., "Optic-Coupled Integrated Circuits", *FPN*, Feb. 1988, pp. 26-27.
Hutcheson, L. D. et al., "Optical Interconnects Replace Hardwire", *IEEE Spectrum*, Mar. 1987, pp. 30-35.
Yanagawa, H. et al., "Low-Loss Single-Mode Wavelength Multiplexer", *OFC '88, Optical Fiber Comm. Conf.*, New Orleans, La., Jan. 25-28, 1988, p. 171.

*Primary Examiner*—James W. Davie
*Attorney, Agent, or Firm*—Wendy W. Koba

[57] ABSTRACT

A subassembly for use in packaging an optoelectronic device (e.g., LED or photodiode) includes a semiconductor (e.g., silicon) base and lid having a variety of etched features (e.g., grooves, cavities, alignment detents) and metalization patterns (e.g., contacts, reflectors) which enable the device to be reliably and inexpensively mounted on the base and coupled to the fiber.

19 Claims, 4 Drawing Sheets

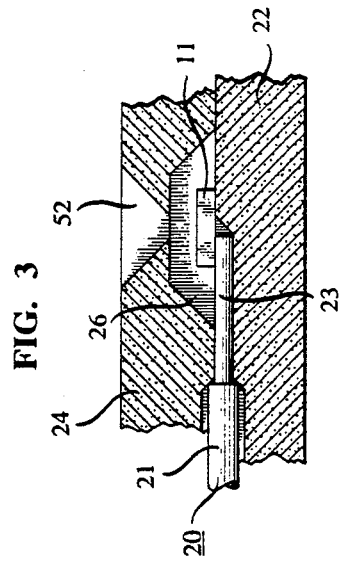
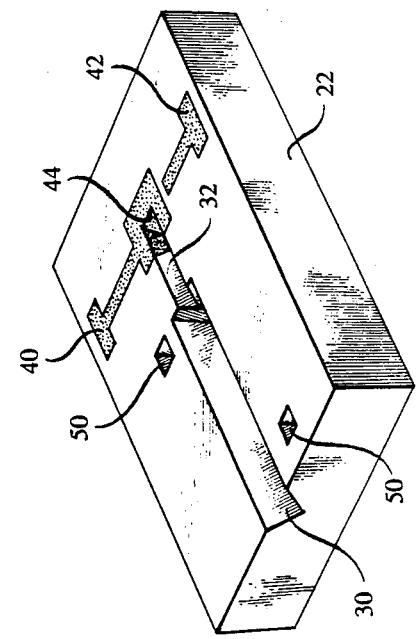
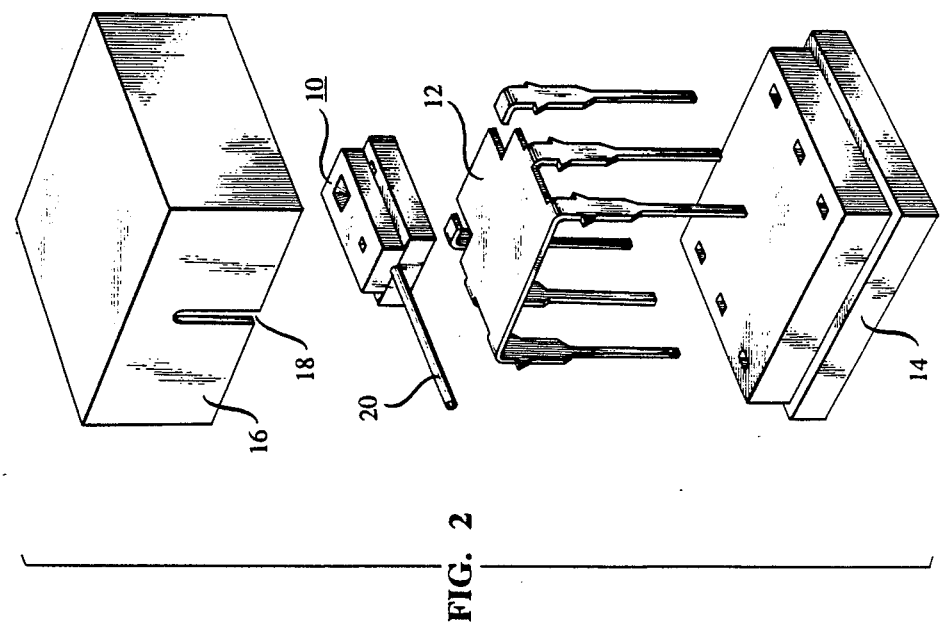

SUBASSEMBLY FOR OPTOELECTRONIC DEVICES

BACKGROUND OF THE INVENTION

This invention relates to lightwave devices and more particularly to a subassembly used in packaging optoelectronic devices such as photodiodes and light emitting diodes (LEDs).

Conventional packages for discrete optoelectronic devices typically are made out of a variety of dissimilar materials, such as metal, glass and ceramic, and involve relatively complicated manipulation of components during assembly. U.S. Pat. Nos. 4,357,072 (LED), 4,119,363 (laser) and 4,233,619 (photodetector) are illustrative. Assembly involves manipulating components in three dimensions in order to place the components in the desired locations; for example, alignment of a device to a substrate, alignment of a fiber to a ferrule, alignment of a ferrule to a package, and finally alignment of the package to the device. These alignment steps depend upon fairly specialized, expensive equipment. In general, therefore, z-axis assembly is not possible in those designs; that is, one cannot simply move the components along a z-axis perpendicular to the substrate and place them on the substrate without further orientation being required in the x-y plane. In addition, because the packages include dissimilar materials, great care is required to insure that the thermal-expansion coefficients are adjusted in such a way that the alignments are stable even though the ambient temperature changes. Instability, of course, leads to mechanical movement of the components and consequently to a decrease in optical coupling between, for example, the device and the fiber. Often this situation leads package designers to compromise between thermal sinking and stability criteria. At the very least, it increases cost.

For many expensive applications, notably long haul transmission systems, the relatively high cost of manufacturing such packages can be tolerated. However, for some cost sensitive, high volume applications, such as lightwave systems between central switching offices or remote-terminals and subscribers' homes (known as the subscriber loop), the high cost of such packages renders them unsuitable.

Thus, it would be desirable to have a packaging scheme which (1) uses, as much as possible, commercially available equipment for the production of the pieceparts, for the alignment of the parts, and for closing of the package; and (2) accommodates different size packages for different applications without requiring extensive retooling or new assembly techniques. For example, it would be desirable, on the one hand, to have a subassembly which fits inside of a dual-in-line package (DIP) header and is adapted to a 125 μm diameter fiber and, on the other hand, to have a different subassembly which is adapted to a larger diameter fiber and is surface mounted on a printed circuit (PC) board. Normally, the fabrication of these two designs would require retooling which is undesirable for reasons of cost and commonality.

SUMMARY OF THE INVENTION

One aspect of the invention is the use of a single crystal semiconductor such as silicon as the basic material from which the subassembly for packaging optoelectronic devices is constructed and to exploit many of the well-known techniques for shaping silicon pieceparts and for depositing metals thereon. The use of silicon in this way will be referred to as "silicon optical bench" technology.

The maturity of silicon technology means several things: first, there is available a large body of silicon processing techniques which, therefore, do not have to be specifically developed; second, there are available numerous pieces of commercial equipment which have been already cost-reduced by years of high volume manufacturing; and, third, using these techniques and equipments, various shapes in silicon pieceparts can be realized by relatively simple and inexpensive photolithographic processes, which do not require large volume to render them cost effective.

In accordance with one embodiment of the invention, the subassembly includes an optoelectric device mounted on a silicon base and one or more of the following features: (1) A groove is located in the base for guiding an optical fiber and a reflector is formed on the end face of the groove. The device is placed over the reflector which directs light between the device and the fiber. Positioning the device over the reflector is the only active alignment step required in the x-y plane. All other alignments are automatically achieved by the geometry of the pieceparts; (2) Electrical contacts are disposed on the base with one of the contacts overlapping the end face of the groove to form the reflector; (3) A silicon lid is disposed on the base with at least one dimension of the lid being less than the corresponding one of the base so that the contacts protrude from under the lid to the exterior of the subassembly; (4) The lid has a cavity for receiving the device and a groove, aligned with the groove in the base, to form a channel in which the coated part of the fiber is positioned; (5) Detents are provided in the base and lid for aligning them to one another; (6) Portions of the exteriors of the base and lid are metalized to provide a ground shield and a place to make electrical contact to the rest of the package.

In another embodiment for devices, such as photodiodes, which are passivated by a conformal coating, an aperture in the lid communicates with the cavity and the coating is injected therethrough.

In yet another embodiment where the device, such as a photodiode, needs to be hermetically sealed, the base and lid are separated by a transparent plate, the lid is hermetically sealed to the plate, and the light transmitted between the device and the fiber passes through the plate.

In still other embodiments where a lens is utilized between the fiber and the device, such as an LED, a silicon plate carrying the lens in a suitable aperture is positioned between the base and lid.

BRIEF DESCRIPTION OF THE DRAWINGS

The invention, together with its various features and advantages, can be readily understood from the following more detailed description taken in conjunction with accompanying drawings, in which the various figures are schematic and hence are not drawn to scale in the interests of clarity.

FIG. 2 is an exploded view of FIG. 1 showing the illustrative subassembly 10, a lead frame 12, a DIP header 14, and a cover 16.

FIG. 3 is an expanded view of a cross-section of the optical subassembly 10 of FIG. 1 depicting a photodiode 11 therein.

FIGS. 4-7 show isometric views of the illustrative subassembly 10 in various stages of fabrication.

DETAILED DESCRIPTION

Figure 1:
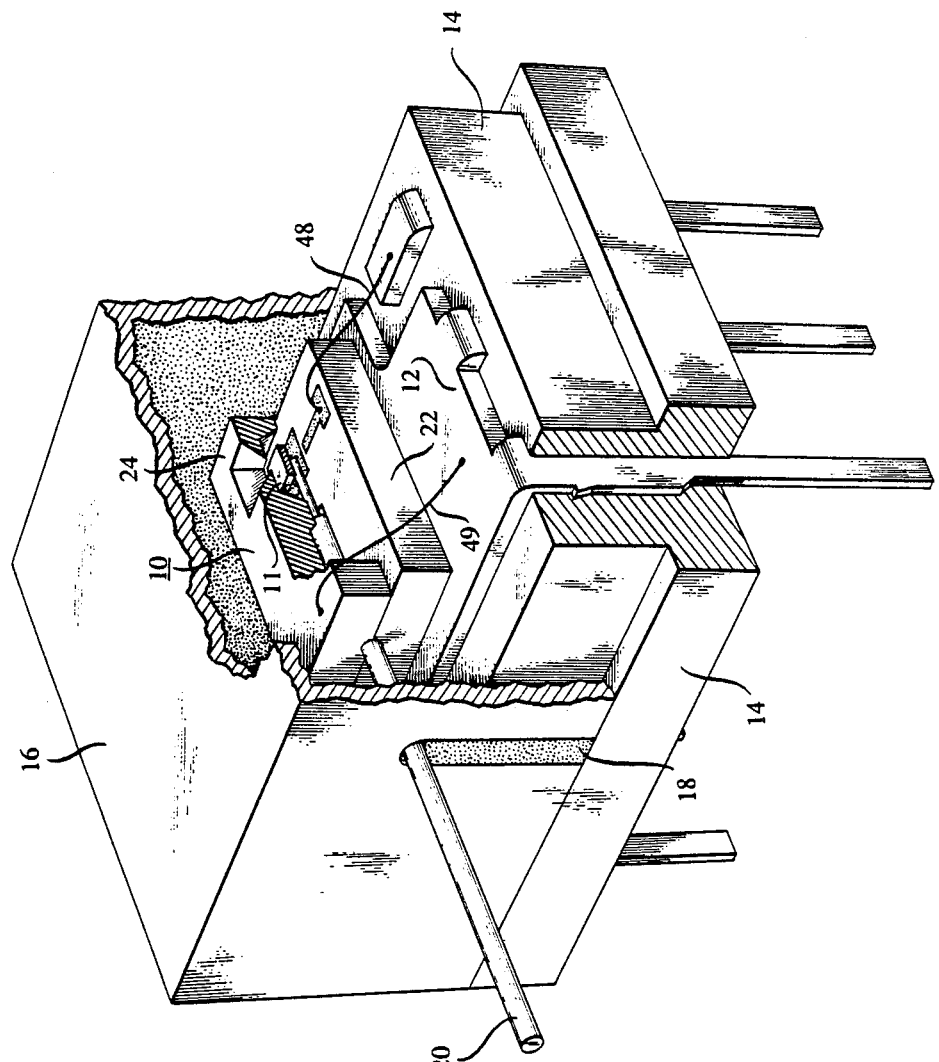
FIG. 1 is an isometric, cut-away view of a package for an optoelectronic device; the package includes a subassembly 10 in accordance with an illustrative embodiment of the invention.

With reference now to FIGS. 1-3, subassembly 10 in accordance with one embodiment of the invention is shown enclosed within a dual-in-line package (DIP). Other package designs, such as molded ones, are also suitable, however. In the DIP configuration the subassembly 10 is mounted on a lead frame 12 which is inserted in a DIP header 14. A cover 16 has a slot 18 to permit an optical fiber 20 to extend from the subassembly 10 to the exterior of the package. Fiber 20 permits lightwave signals to be transmitted to and/or from an optoelectronic device (e.g., photodiode 11) within the subassembly.

The subassembly 10 is constructed in accordance with the invention from a single crystal semiconductor, preferably silicon in order to exploit the mature silicon technology from the standpoint of processing and equipment availability, as discussed earlier. In addition, the design reduces to one the number of alignment steps which have to be performed in the x-y plane. Thus, the invention is advantageously very close to the desiderata of z-axis alignment. More specifically, FIGS. 4-7 show subassembly 10 for a photodiode 11 including a single crystal silicon base 22 on which the photodiode is mounted, a single crystal silicon lid 24, and an optical fiber 20 disposed in a channel formed along the interface between the base and lid so that it is optically coupled to the photodiode. The invention is characterized by one or more of the following features.

(1) Anisotropically-etched tandem grooves (30 and 32 in the base and 34 in the lid) provide strain relief for and alignment of fiber 20. These grooves are preferably formed by the process described in concurrently filed application Ser. No. 163,685 (G. E. Blonder 9) entitled "Method of Making an Article Comprising a Tandem Groove and Article Produced by the Method," U.S. Pat. No. 4,810,557, which is incorporated herein by reference. Groove 30 in the base is aligned with groove 34 in the lid so as to receive the coated portion 21 of fiber 20, and the width of groove 34 is slightly smaller than that of groove 30 so that portion 21 fits snugly and provides strain relief. Groove 32, on the other hand, is formed in the base in tandem with groove 30 but has a considerably smaller width so as to receive and align the bare end portion 23 of fiber 20. The use of tandem grooves is preferred where the shape and structural strength of the fiber coating (e.g., urethane) are not sufficiently well controlled in different environmental conditions (e.g., humidity) that the coating can be relied on for alignment purposes. On the other hand, some fiber coatings (e.g., polyimide) are suitable for alignment purposes; and, in those cases, neither the tandem groove arrangement in the base nor the groove in the lid need be utilized; rather the base may simply have a groove for holding the coated portion 21 of the fiber against the bottom of the lid.

(2) After the grooves are etched, the base is oxidized (e.g., 1-10 μm of $SiO_2$ is formed) and metalized, and standard photolithography is utilized to pattern electrical contacts 40 and 42. The oxide layer (not shown) prevents the contacts from being short circuited through the silicon and reduces their mutual capacitance. As shown in FIG. 4, contact 40 overlaps the end face of groove 32 and forms a turning mirror of reflector 44. Of course, contact 40 and reflector 44 could be separate if so desired. When the major surface of the base is a (100) crystallographic plane, the end face is a (111) crystallographic plane and hence reflector 44 is oriented at a 54.7° angle. The latter serves both as a mechanical stop for the fiber and as a director of light emanating from the end of fiber 20. The reflected light is thus made incident on the photosensitive area of photodiode 11. Even though mirror 44 is not at a 45° angle, it is adequate to couple light into the photodiode and to enable the axis of the fiber and that of the photodiode to be aligned to about ±1 μm (where ±5 μm accuracy is sufficient).

Figure 5:
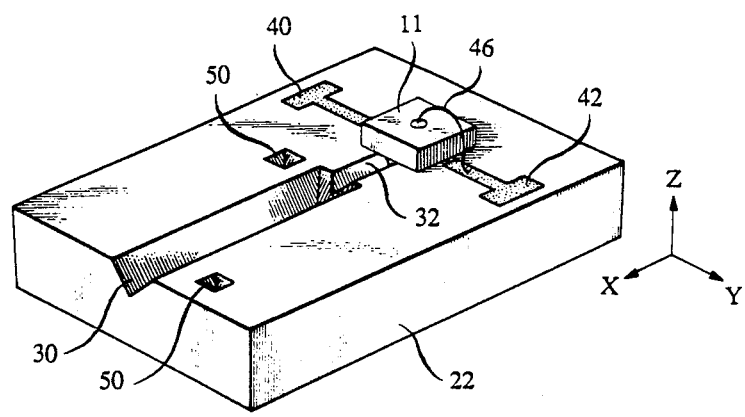

(3) The photodiode is illustratively an InP/InGaAs back-illuminated design of the type described by O. K. Kim in U.S. Pat. No. 4,608,586; that is, the device is illuminated through an opening in the metalization on its transparent substrate, thereby to permit ingress of light into the photosensitive area of the photodiode. The substrate metalization of the photodiode is bonded to contact 40, and the photodiode is oriented in the x-y plane so that its photosensitive area is over the mirror 44. Advantageously, this step is the only active alignment step required in the assembly procedure. After alignment is accomplished, the top contact of the photodiode is connected to contact 42 via a wire bond 46, as shown in FIG. 5.

Figure 6:
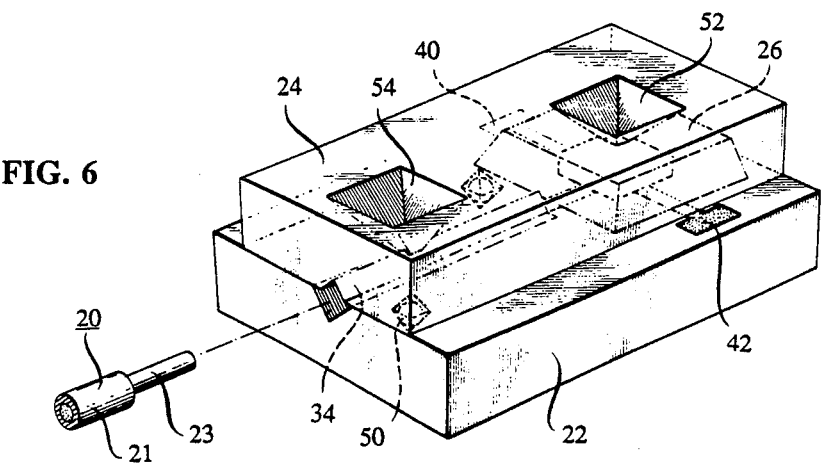
Figure 7:
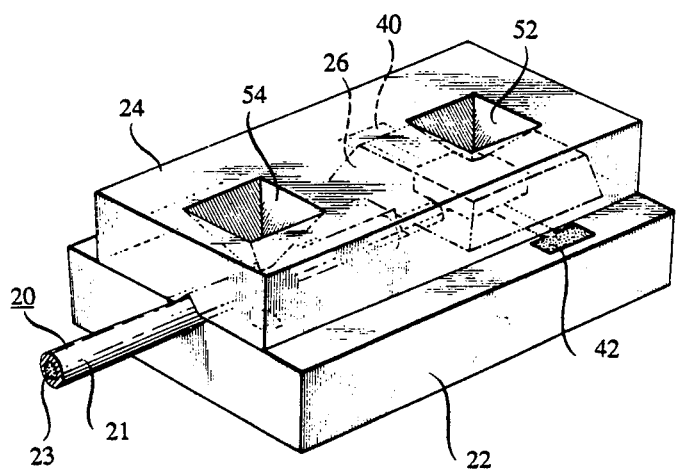

(4) The dimensions of the base, lid and contacts are mutually adapted so that the pads at the ends of the contacts 40 and 42 extend out from under the lid, as shown in FIGS. 6 and 7, thereby enabling wire-bonds to be made to the lead frame. One such bond 48 is shown in FIG. 1.

(5) The lid and base are aligned relative to one another by means of detents 50. Illustratively, these detents are small pyramidal-shaped holes etched into the lid and base with a ball bearing in each hole in the base to facilitate alignment by merely snapping the base and lid together. The balls may be fabricated from a number of materials such as metal, sapphire or tungsten carbide. This technique has a relatively large capture range because the balls are curved and, therefore, tend to readily guide a slightly misaligned lid into alignment. In addition, instead of aligning lids and bases one at a time, one can take advantage of the fact that the bases are cut from a wafer and that prior to separating the bases, the photodiodes can be mounted thereon, tested and burned in before the lids are put in place. Or, the bases may be cut into 1×N strips before the photodiodes, N in number, are mounted. A similar 1×N strip of lids can then be aligned to the strip of bases using, for example, only a pair of alignment detents, one at each end of the strips rather than a pair for each individual lid and base.

(6) The lid has a cavity 26 and a pair of apertures 52 and 54, as shown in FIG. 7. When the lid is in place, the photodiode 11 is located in the cavity and funnel-shaped aperture 52 permits a conformal coating (e.g., silicone for passivation) to be inserted therethrough (and then cured) to cover the photodiode. Likewise, aperture 54 permits epoxy or other adhesive to be inserted to secure the position of the fiber 20 in the subassembly. Where, however, passivation is not required (or a hermetic design is), aperture 52 may be omitted. Likewise, where the fiber needs to slide in and out of the subassembly (in a plug-in design, for example), the epoxy/adhesive and aperture 54 may be omitted.

Figure 11:
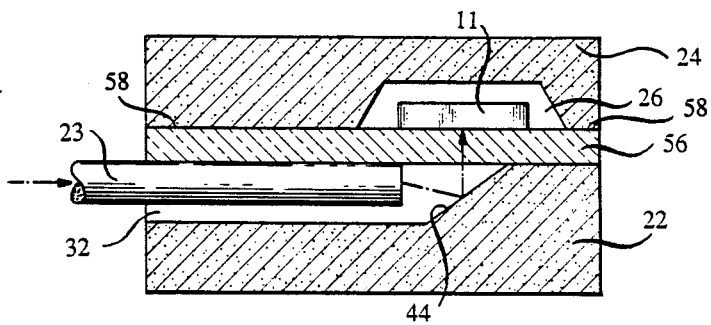
FIG. 11 shows a cross-sectional view of a hermetic subassembly for use with a photodiode in accordance with yet another embodiment of the invention.

(7) Where the system specifications require that the photodiode be hermetically sealed, it is generally undesirable for the coated portion of the fiber to be in the same hermetic environment as the photodiode. In this case, a design of the type shown in FIG. 11 may be employed. Here, a transparent plate 56 is disposed between the silicon lid 24 and the silicon base 22. Plate 56 may be fabricated from a number of materials including, for example, glass, silicon, or a silicon substrate-silicon oxide layer composite with a hole etched in the substrate to expose the oxide layer. Electrical contacts (not shown) on the lid 24 or on the plate 56 extend from under the lid as in FIGS. 6-7, but the lid has no apertures corresponding to 52 or 54 of FIG. 7 since no conformal coating and no epoxy is utilized, as mentioned above. The lid is sealed (e.g., with solder or glass frit) along its periphery 58 to one side of plate 56 so that the lid and plate form a hermetic enclosure for the photodiode. Base 22, which is secured to the opposite side of plate 56, has a V-groove 32 for guiding the bare portion 23 of the fiber and a turning mirror 44 for redirecting the light from the fiber through the plate to the photodiode.

(8) The top of the lid and the bottom of the base are metalized (not shown) to provide a ground shield. For adhesion purposes, the silicon may be oxidized before the metal is deposited. As shown in FIG. 1, the metalized bottom of the base contacts lead frame 12, and the top of the lid is connected thereto by wire bond 49.

Subassemblies according to FIGS. 1-7 have been fabricated using silicon optical bench technology with the silicon pieceparts (base, lid) measuring about 3 mm wide by 4 mm long by 750 $\mu$m thick. The anisotropically etched V-grooves 30, 32 and 34 were adapted to receive single mode glass fibers 20 having a coated portion 21 with about a 250 $\mu$m diameter and a bare portion 23 with about a 125 $\mu$m outside diameter. The oxide on the silicon base was about 10 $\mu$m thick. The contacts 40 and 42 and mirror 44 were Ti-Pt-Au multilayers (Cr-Au is also suitable) with Au the outermost layer. The photodiode 11, which had an active area of about 75 $\mu$m, was bonded to contact 40 with a eutectic solder (Au/Ge or Au/Sn) which was evaporated onto the substrate side of the photodiode. Because the silicon base is extremely flat, very thin (e.g., 3 $\mu$m) layers of solder could be used, thereby reducing expense associated with the cost of a separate preform of eutectic solder. From a convenience standpoint, the fiber should not be secured into the subassembly too soon during the fabrication sequence, otherwise manipulation of the subassembly may be cumbersome. Thus, it is preferred that, after the base, photodiode and lid are in place, but before the conformal coating is applied, the subassembly is bonded to the lead frame with epoxy or with a lower melting point solder than used for the photodiode. After wire bonds are made to the photodiode and to the ground shields, the fiber is inserted into the V-grooves of the subassembly and epoxied in place.

It is apparent that the lid serves multiple purposes including: protecting the device during molding operations associated with encapsulating the subassembly in a package; electrically isolating the device; containing epoxy and the conformal coating, if necessary; and guiding the optical fiber.

In operation, photodiodes packaged in this fashion are relatively inexpensive, have reasonably high yields and responsivities of about 0.8-0.9 A/W. No failures were observed when the packages were cycled between $-40°$ C. and $+85°$ C. in ambient humidity. The frequency response of the package depends on a number of factors, principally the oxide thickness, the area of the contacts and the length of the leads. When properly designed, a frequency response of about 200 MHz was measured.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention. In particular, although the subassemblies of FIGS. 1-7 and 11 were described in terms of light in a fiber being detected by a photodiode, they are also useful for coupling light from an LED into the fiber. However, when doing so, the divergence of the light emission from the LED affects the coupling efficiency into the fiber, and the relatively high current carried by the LED requires adequate heat sinking. These considerations are taken into account in the LED embodiments of the invention shown in FIGS. 8-10. Also, when a larger core multimode fiber is utilized, a lens may be needed to focus down to the active area of a photodiode.

Figure 8:
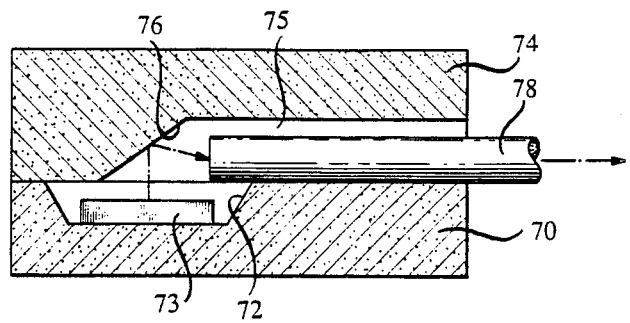
FIGS. 8-10 show cross-sectional views of subassemblies for use with LEDs in accordance with other embodiments of the invention.

The first LED embodiment shown in FIG. 8 uses a base 70 having a well 72 in which an LED 73 is bonded. The base may be a silicon piecepart or, for example, a PC board. The LED is positioned so that its photosensitive area (where most of its heat is generated) is closest to base 70. Among other things, the base serves as a heat sink and, in the case of a DIP, would be bonded to a lead frame which also serves, among other things, as an additional heat sink. A lid 74 has a V-groove 75 which is terminated with a reflector 76 in a manner similar to that of the photodiode subassemblies of FIGS. 1-7. Although reflector 76 is depicted as being planar, there are techniques for making it curved so as to focus light into the fiber.

Light emitted from the LED is incident on the reflector and imaged onto the end of a multimode fiber 78. This scheme, which is capable of achieving about 30% coupling into the fiber, is adversely affected by two factors: beam divergence from the LED and the numerical aperture (NA) profile of the fiber (e.g., the NA is maximum on the axis of a parabolically graded index fiber and decreases for off-axis rays). Thus, from a divergence standpoint, the optimum LED-to-fiber separation may be less than that permitted by the mirror and, therefore, may not be attainable with this design; whereas from an NA standpoint, because the mirror is not at a 45° angle, some of the reflected light will be off-axis, thereby making the axial position of the fiber important. Note, the mirror is at an angle of 54.7° for (100) oriented silicon, but if the mirror were formed in a separate piece of silicon misoriented off the (100) plane by about 10°, then the mirror would be oriented at about 45°. In this case, however, groove 75 would be skewed (rather than horizontal), but another groove (not shown) could be formed in the (100) oriented base 70 for guiding the fiber 78.

Although coupling in FIG. 8 can be increased to about 60% by filling the cavity between the LED and fiber with silicone, it is advantageous in some cases to include a lens in the subassembly to collimate the light and to reduce the significance of the fiber-to-LED spacing. Such designs are shown in FIGS. 9–10.

Figure 9:
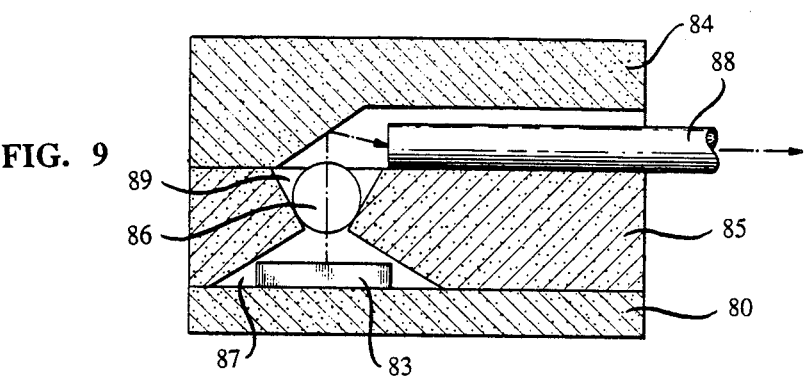

In FIG. 9, the LED 83 is mounted on a base 80 which, as above, may be a silicon piecepart or a PC board onto which the LED-fiber subassembly is mounted. This subassembly includes a silicon lid 84 having a V-groove/turning mirror arrangement for a multimode fiber 88, as described above. In addition, it has an intermediate silicon piecepart 85 which serves as a carrier for the lens 86. One side of the carrier has an anisotropically etched pyramidal hole 89 coupled through a narrow opening to a similarly etched pyramidal cavity 87. The LED 83 is positioned in cavity 87, and the lens 86 is typically mounted in the hole 89, secured in place and anti-reflection (AR) coated. The narrowness of the opening at the bottom of hole 89 prevents the lens from dropping into the cavity.

Figure 10:
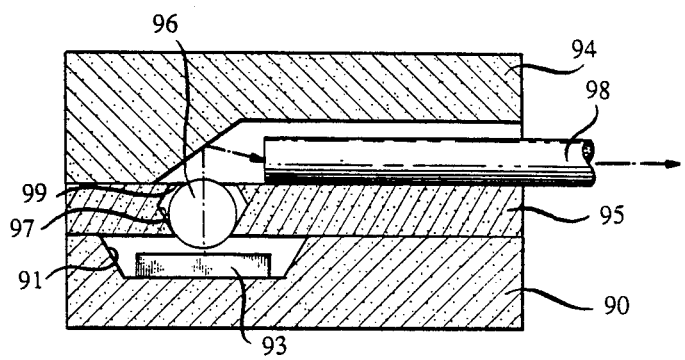

Alternatively, as shown in FIG. 10, the base 90 has a recess 91 into which the LED 93 is mounted. As above, the base may be, for example, a silicon base or a PC board with a recess in it. The V-groove/turning mirror arrangement of silicon lid 94 is similar to that described above, but the silicon carrier 95 has a differently shaped hole which extends through it. Here, hole 97 forms an opening in the top surface of carrier 95 which is large enough to receive the lens 96, but the opening in the bottom surface is small enough to support the lens and prevent it from falling through the hole. Typically, the lens is secured in place by solder or other means. One feature of the embodiment of FIG. 10 is that, prior to assembly, the carrier serves as a handle for manipulating the lens as, for example, when an AR coating is to be applied thereto. While this aspect can also be realized with the piecepart 85 of FIG. 9, it may be easier to retain the lens in place in FIG. 10 by plating (or otherwise sealing) the space between the lens and the carrier at 99, for example.

Finally, it will be appreciated that although today's technology suggests that silicon is the preferred material from which the principal pieceparts of the invention are made, it is possible that different circumstances (e.g., system specifications and cost considerations) might render it desirable to utilize a different semiconductor (e.g., Ge, GaAs).

What is claimed is:

1. A subassembly for an optoelectronic device comprising
    a semiconductor base having a major surface and a first groove in said surface capable of receiving a portion of an optical fiber, said first groove having side walls and an end face formed by crystallographic planes which are oblique to said surface,
    an insulative layer formed on at least a portion of said surface, and
    metal contacts disposed on said layer, at least one of said contacts overlapping said end face and forming a reflector,
    said device being disposed over said reflector and connected to said contacts, so that said reflector directs light between said device and said fiber.

2. The subassembly of claim 1 wherein said base has a second groove arranged in tandem with said first groove and extending to the exterior of said subassembly, said fiber having a larger diameter portion which fits into said second groove a narrower diameter portion which fits into said first groove.

3. The subassembly of claim 2 wherein the length of said grooves permits the end of said fiber to abut said reflector.

4. The subassembly of claim 1 further including a semiconductor lid disposed on said base, said lid having a major surface and a cavity therein for receiving said device, and further having a third groove therein aligned with said first groove, thereby forming an elongated channel for receiving said fiber.

5. The subassembly of claim 4 wherein said lid has an opening in communication with said cavity and a conformal coating, inserted through said opening, covers said device.

6. The subassembly of claim 4 including said fiber attached thereto and wherein said lid has an opening in communication with said elongated channel and an adhesive, inserted through said opening, secures said fiber to said subassembly.

7. The subassembly of claim 4 wherein exterior major surfaces of said base and lid are metalized.

8. The subassembly of claims 1–6 or 7 wherein said semiconductor comprises single crystal silicon, said major surface is a (100) crystallographic plane and said end face is a (111) crystallographic plane.

9. The subassembly of claims 1–6 or 7 wherein device is a photodiode.

10. A subassembly for an optoelectronic device comprising
    a semiconductor base having a major surface,
    an insulative layer on said surface,
    metal contacts disposed on said layer, said device being located on said surface and connected to said contacts, and
    a semiconductor lid having a cavity, said lid being disposed over said base so that said device is positioned in said cavity, at least one dimension of said lid parallel to said surface being less than the corresponding dimension of said base, so that segments of said contacts extend from under said lid to the exterior of said subassembly, and
    said subassembly having channel means for receiving an optical fiber for carrying light between said device and the exterior of said subassembly.

11. The subassembly of claim 10 wherein said lid has an opening in communication with said cavity, and a conformal coating, inserted through said opening, covers said device.

12. The subassembly of claim 10 including said fiber attached thereto and wherein said lid has an opening in communication with said channel means and an adhesive, inserted through said opening, secures said fiber to said subassembly.

13. The subassembly of claim 12 wherein said channel means comprises a groove in said base and a groove in said lid, said grooves facing, and being aligned, with one another and having side walls which are crystallographic planes.

14. The subassembly of claim 13 wherein said channel means comprises a reflector and a third groove in tandem with the groove in said base, said third groove having a crystallographic end face on which said reflector is disposed, said device being positioned over said reflector which directs light between said device and said fiber.

15. The subassembly of any one of claims 10–13 or 14 wherein said base and lid comprise single crystal silicon.

16. A subassembly for an optoelectronic device comprising
- a single crystal silicon base having a (100) major surface and first and second grooves arranged in tandem in said surface, said first groove being narrower than said second groove, said second groove extending to the exterior of said subassembly and capable of receiving a larger diameter portion of an optical fiber and said first groove capable of receiving a narrower diameter portion of said fiber, said first and second grooves having side walls and an end face formed by crystallographic planes which are oblique to said surface,
- a silicon oxide insulative layer formed on at least a portion of said surface,
- metal contacts disposed on said layer, at least one of said contacts overlapping said end face and forming a reflector,
- said device being disposed over said reflector and connected to said contacts, so that said reflector directs light between said device and said fiber,
- a single-crystal silicon lid disposed on said base, said lid having a (100) major surface and a cavity therein for receiving said device, and further having a third groove therein aligned with said first groove, thereby forming an elongated channel for receiving said fiber,
- said lid using a first opening in communication with said cavity and a conformal coating, inserted through said opening, covering said device, and having a second opening in communication with said elongated channel and an adhesive, inserted through said opening, securing said fiber to said subassembly,
- exterior major surfaces of said base and lid being metalized,
- at least one dimension of said lid parallel to said surface being less than the corresponding dimension of said base, so that segments of said contacts extend from under said lid to the exterior of said subassembly, and
- means for aligning said lid and base to one another comprising at least one hole formed by crystallographic planes in each of said base and lid, said holes being positioned so that when they are aligned, then the base and lid are also aligned, and a sphere positioned in one of the holes so as to guide said holes into alignment.

17. A subassembly for an optoelectronic device comprising
- a base on which said device is mounted,
- a semiconductor lid positioned over said base, said lid having a groove therein for receiving an optical fiber and a reflector formed on an endface of said groove to direct light between said fiber and said device,
- a semiconductor carrier having an aperture extending therethrough,
- said carrier being positioned between said base and said lid, and
- a lens mounted in said aperture so as to focus light between said reflector and said device.

18. The subassembly of claim 17 wherein said base comprises a semiconductor substrate.

19. The subassembly of claim 17 wherein said base comprises a printed circuit board.

* * * * *